United States Patent [19]
Yabe et al.

[11] Patent Number: 5,558,448
[45] Date of Patent: Sep. 24, 1996

[54] ROLLING BEARING

[75] Inventors: Toshikazu Yabe; Hiromitsu Asai; Magozo Hamamoto, all of Kanagawa, Japan

[73] Assignee: NSK Ltd., Tokyo, Japan

[21] Appl. No.: 499,216

[22] Filed: Jul. 7, 1995

[30]     Foreign Application Priority Data

Jul. 7, 1994  [JP]  Japan .................... 6-177713

[51] Int. Cl.$^6$ .................................................. F16C 33/66
[52] U.S. Cl. .................. 384/470; 384/527; 29/898.067
[58] Field of Search .................... 384/470, 527, 384/902; 29/898.067; 252/12.2

[56]            References Cited

U.S. PATENT DOCUMENTS

| | | | |
|---|---|---|---|
| 3,135,564 | 6/1964 | Agens | 384/470 |
| 3,529,875 | 9/1970 | McKee | 384/470 |
| 4,073,552 | 2/1978 | Christy | 384/470 |
| 4,226,484 | 10/1980 | Glassow et al. | 384/470 |
| 4,243,276 | 1/1981 | Persson et al. | 384/470 |
| 5,401,105 | 3/1995 | Suzuki et al. | 384/470 |

FOREIGN PATENT DOCUMENTS

| | | |
|---|---|---|
| 61-6429 | 1/1986 | Japan . |
| 1-93623 | 4/1989 | Japan . |
| 4-133023 | 12/1992 | Japan . |

*Primary Examiner*—Thomas R. Hannon
*Attorney, Agent, or Firm*—Sughrue, Mion, Zinn, Macpeak & Seas

[57]              ABSTRACT

A rolling bearing comprising an outer race having one track, an inner race having the other track, a plurality of rolling elements arranged between the both tracks, and a cage for retaining the plurality of rolling elements in such a way that the rolling elements can roll freely, wherein the cage is a lubricating oil-containing polymer member obtained by molding a synthetic resin containing 10 to 80% by weight of a lubricating oil. The cage retains a sufficient amount of a lubricating oil at a high rate of retention so that a lubricating action can be maintained in a stable manner for a prolonged period of time, and it is produced at low cost.

6 Claims, 2 Drawing Sheets

5,558,448

ROLLING BEARING

FIELD OF THE INVENTION

This invention relates to a rolling bearing which is used in a rotation bearing part of hard disc drives (HDD), video tape recorders (VTR), digital audio tape recorders (DAT), laser beam printers (LBP), etc.

BACKGROUND OF THE INVENTION

Ball bearings of the type shown in FIG. 1, a kind of rolling bearings, are widely used for bearing various rotating parts. A ball bearing is composed of a concentrically assembled set of inner race 2 and outer race 4, inner race 2 forming inner raceway track 1 (one track) on its outer circumference, and outer race 4 forming outer raceway track 3 (the other track) on its inner circumference, with a plurality of balls 5 rotatably arranged as rolling members between inner raceway track 1 and outer raceway track 3. Each of annular seal plates 6 is fitted, at one end thereof, to the inner circumferential surface of outer race 4 at each end of outer race 4 in its width direction so that the grease applied around balls 5 or dust generated may not leak outside or dust suspending outside may not enter in the vicinities of the balls.

Plural balls 5 are rotatably retained by cage 7 shown in FIGS. 2 and 3. Cage 7 is made of an integrally injection-molded synthetic resin. Cage 7 integrally consists of annular main body 8 having a plurality of retaining parts 9 on one side thereof. Each retaining part 9 is formed by a pair of elastic lugs 10 spaced from each other. The opposing faces of a pair of elastic lugs 10 have a concave curved surface thereby to make a spherical form.

Each of balls 5 is pressed into the space between a pair of elastic lugs 10 while elastically widening the interval between the pair of elastic lugs 10 and is thereby rotatably retained by each retaining part 9.

Cage 7 is generally made of a metal or a synthetic resin which can be injection molded, such as a polyamide resin, a polyacetal resin or a polybutylene terephthalate resin, or a synthetic resin composition comprising such a synthetic resin and glass fiber, carbon fiber, organic fiber, etc.

Since cage 7 only functions to retain balls 5 lubrication of a ball bearing is achieved by using a lubricating oil or a semi-solid lubricant, such as grease. However, where, in particular, a semi-solid lubricant such as grease is used, resistance to stirring of the lubricant increases the torque required for rotating a shaft borne by the bearing. Besides, the torque fluctuation increases with rotation.

Such a high torque, wide torque fluctuation, and noise of the bearing give rise to great problems on practical use in the case of small diameter ball bearings having an inner diameter of not more than 6 mm, such as those incorporated into HDD, VTR, DAT or LBP.

In order to solve these problems, a ball bearing in which cage 7 itself has a lubricating function has been proposed. For example, JP-A-U-4-133023 (the term "JP-A-U" as used herein means an "unexamined published Japanese utility model application") discloses a rolling bearing cage in which the U-shaped space of a section in the axial direction of a column-shaped part is filled with a solid lubricant (plastic grease).

JP-A-61-6429 (the term "JP-A" as used herein means an "unexamined published Japanese patent application") discloses a bearing cage made of a polyamide-imide resin having open cells at a void volume of 7 to 17% impregnated with a completely fluorinated oil.

JP-A-1-93623 discloses a cage which is produced by injection molding an oil-containing plastic composition comprising a nylon plastic (6,6-nylon) and a binder containing about 10% mineral oil to obtain a cage having an oil content of 10% and then immersing the resulting cage in a mineral oil at 120° C. for 7 days to increase its oil content to 30%.

These conventional cages having a lubricating function involve the following disadvantages, however. That is, production of the cage of JP-A-U-4-133023 requires labor in filling plastic grease into the U-shaped space of the column part. This cannot be done through a single injection shot, resulting in increase of cost.

Additionally, when the plastic grease in the U-shaped space is solidified by heat treatment followed by allowing to cool, the plastic grease undergoes shrinkage to a higher degree than with the frame, i.e., the U-shaped part, tending to form a gap between the solidified plastic grease and the frame. The gap is broadened as the grease oozes out on use of the bearing. It follows that the plastic grease moves in the U-shaped space, making abnormal noise.

Production of the cage disclosed in JP-A-61-6429 requires much labor for providing open cells. Moreover, the cage tends to have low mechanical strength due to much void. Further, since a polyamide-imide resin, which is a hydrocarbon-based compound, has insufficient capability of retaining a completely fluorinated oil, i.e., a fluorine-containing compound, the oil oozes out relatively soon, failing to maintain a lubricating function for a prolonged period of time in a stable manner. Furthermore, since a fluorinated oil is inferior to a hydrocarbon oil in lubricating action, the bearing tends to have reduced acoustic characteristics.

Production of the cage of JP-A-1-93623 ; involves immersion of a molded article in a lubricating oil at a high temperature (120° to 130° C.) for a long time (about 7 days) in order to increase the oil content. The lubricating oil and the plastic are apt to be deteriorated during the immersion. The molded article undergoes considerable dimensional change on oil immersion, and the change is instable and varies widely among lots. Bearings using such a cage show large scatter in performance quality.

Moreover, since a large proportion of the lubricating oil is retained in the shallow portion in the vicinity of the surface, oozing of the lubricating oil occurs relatively in the early stage of use, resulting in a failure of maintaining stable lubrication for a long period of time.

Thus, the conventional cages having a lubricating function have various drawbacks or problems and do not withstand practical use sufficiently.

SUMMARY OF THE INVENTION

An object of the present invention is to provide a rolling bearing using a cage which can retain a sufficient amount of a lubricating oil at a high rate of retention so that a lubricating action can be maintained in a stable manner for a prolonged period of time and which can be produced at low cost.

The above object of the present invention is accomplished by a rolling bearing comprising an outer race having one track, an inner race having the other track, a plurality of rolling elements arranged between the both tracks, and a cage for retaining the plurality of rolling elements in such a way that the rolling elements can roll freely, wherein the cage is a lubricating oil-containing polymer member obtained by molding a synthetic resin containing 10 to 80% by weight of a lubricating oil.

In a preferred embodiment of the present invention, the synthetic resin is a polyolefin resin, and the lubricating oil comprises at least one of a mineral oil, an alkyl polyphenyl ether oil, an alkylnaphthalene oil and a poly α-olefin oil.

DETAILED DESCRIPTION OF THE INVENTION

Figure 1:
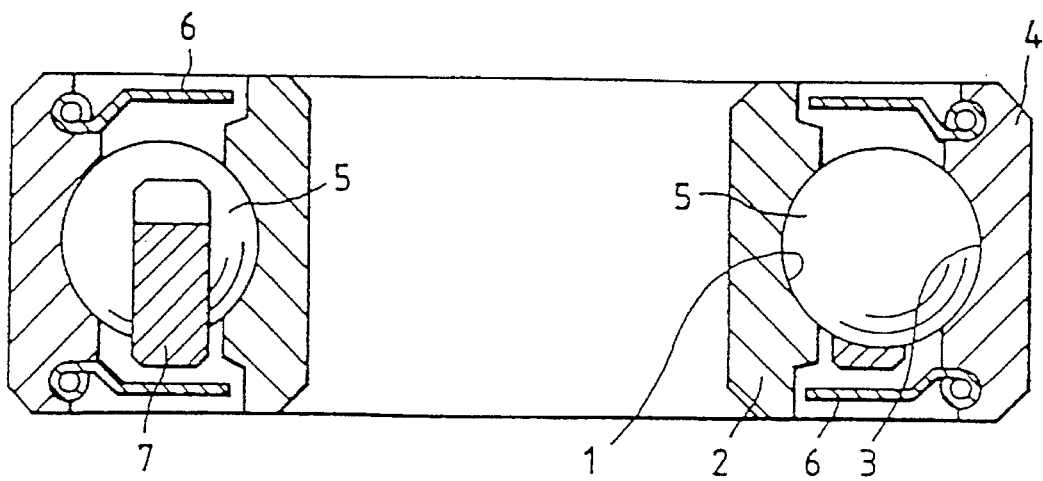
FIG. 1 is a cross section of an example of ball bearings.

The synthetic resin to be used in the present invention is preferably a material having a high oil absorption and suitable for injection molding. Specifically, thermoplastic resins that can be injection molded, such as polyethylene, polypropylene (preferably having a number-average molecular weight of from 100,000 to 400,000), and polymethylpentene (preferably having a number-average molecular weight of from 600,000 to 2,000,000), are suitable.

Polyethylene which can preferably be used has a low to middle molecular weight suited to injection molding, i.e., a number-average molecular weight of not lower than 10,000 and lower than 1,000,000. In order to improve strength, ultra-high-molecular-weight polyethylene having a number-average molecular weight of 1,000,000 to 6,000,000 (hereinafter abbreviated as UHMWPE) may be used in combination. Since an injection molding material having too a high content of UHMWPE becomes too viscous on melting, a suitable content of the UHMWPE is not higher than 10% by weight based on the total amount of the injection molding material.

Polypropylene will not have such an ultra-high molecular weight because of its tendency to self-degradation. Polypropylene containing such a large amount of a lubricating oil as high as 10 to 80% by weight fails to solidify to have sufficient hardness for use as a cage. Therefore, polypropylene should be used in combination with UHMWPE for assuring hardness. In this case, the amount of UHMWPE is preferably from 5 to 10% by weight based on the total amount of the injection molding material.

The lubricating oil which can be used in the present invention preferably includes those having relatively low polarity, such as mineral oils; alkyl polyphenyl ether oils, e.g., octadecyl diphenyl ether; alkylnaphthalene oils, e.g., eicosylnaphthalene; and poly α-olefin oils. Polyethylene or polypropylene, which is a matrix of an injection molding material, has low polarity and therefore has low affinity to highly polar lubricating oils such as polyglycol oils, polyol ester oils and ester oils. It is difficult for these resins to retain a large amount of the highly polar lubricating oil so that the lubricating oil would ooze out soon and cause lubrication failure in short-term use.

If desired, the lubricating oil to be used may contain various additives, such as antioxidants, rust inhibitors, wear inhibitors, defoamers, extreme pressure agents, and the like.

The cage according to the present invention is obtained by injection molding an injection molding material comprising the above-mentioned synthetic resin and lubricating oil into any desired shape. The lubricating oil content of the injection molding material is maintained in the resulting molded article.

The injection molding material preferably comprises 20 to 90% by weight, still preferably 60 to 80% by weight, of a synthetic resin and 10 to 80% by weight, still preferably 20 to 40% by weight, of a lubricating oil, based on the total amount of the injection molding material. Because the lubricating oil content in the injection molding material is a lubricating oil content in the resulting cage, if the former is less than 10% by weight, the latter is absolutely insufficient so that the lubricating oil to be supplied from the cage to the rolling part would be exhausted soon to impair durability of the bearing. If the former exceeds 80% by weight, mechanical strength necessary for practical use as a cage is hardly assured.

For the purpose of increasing mechanical strength of a cage or improving moldability of the injection molding material, the above-described injection molding material may contain various fillers, for example, calcium carbonate, magnesium carbonate; inorganic whiskers, such as potassium titanate whisker and aluminum borate whisker; inorganic fibers, such as glass fiber, asbestos, and metal fibers; fabric or braid made of these fibers; and organic compounds, such as carbon black, graphite powder, carbon fiber, aramid fiber, polyester fiber, and various thermosetting resins, e.g., polyimide and polybenzimidazole.

For the purpose of preventing thermal deterioration of the synthetic resin, the injection molding material may further contain antioxidants, such as N,N'-diphenyl-p-phenylenediamine and 2,2'-methylenebis(4-ethyl-6-t-butylphenol).

In order to assure the lubricating action for use as a cage, these additives other than the synthetic resin and the lubricating oil are preferably used in an amount of not more than 20% by weight based on the total injection molding material.

The injection molding material is prepared by uniformly mixing a lubricating oil, a synthetic resin, and necessary additives, uniformly melting the mixture at a temperature not lower than the melting point of the synthetic resin, cooling the molten mixture, and, at the point when the synthetic resin begins to solidify, grinding the mixture by means of a grinder to prepare a homogeneous pasty or powdered mixture.

Depending on the kind of the lubricating oil, cases are sometimes met with in which the synthetic resin if added all at once cannot be mixed with the lubricating oil uniformly. This being the case, the synthetic resin is mixed with the lubricating oil in several divided portions. For example, about 10 to 40% by weight of the whole synthetic resin is first mixed with the lubricating oil, the mixture is heat-melted, and when the molten mixture begins to solidify on cooling, the rest of the synthetic resin is added thereto, and the mixture is ground by means of a grinder to obtain a uniform pasty or powdered mixture. It is preferable to use a powdered synthetic resin for ease of making a pasty or powdered mixture.

The cage according to the present invention can be produced by injection molding the above-mentioned injection molding material. Non-limiting examples of the injection molding machine include a plunger type injection machine and an in-line screw type injection machine.

Molding conditions are not particularly limited and are the same as those employed for molding general synthetic resins containing no lubricating oil. For instance, the molding temperature is 170° to 180° C. for a material comprising polyethylene, 210° to 220° C. for a material comprising polypropylene, and 250° to 260° C. for a material polymethylpentene.

A ball bearing, which is a kind of the rolling bearings of the present invention, is assembled by, for example, retaining a plurality of rolling elements, i.e., balls 5, between inner race 2 and outer race 4 by means of the above-described cage 7 comprising a lubricating oil-containing polymer member as shown in FIG. 1.

The thus obtained ball bearing may be immersed in a lubricating oil or a solution prepared by diluting a lubricating oil with an appropriate volatile solvent in an appropriate concentration thereby to form a uniform oily film on the surface of the bearing (called oil plating).

The lubricating oil to be used for oil plating may be the same as or different from that used in the injection molding material. Examples of suitable lubricating oil for oil plating are ester oils, such as 2-ethylhexyl sebacate, mineral oils, poly α-olefin oils, and alkyl diphenyl ether oils. In order to improve internal anticorrosion or lubricating properties, the lubricating oil for oil plating may contain 3 to 6% by weight of a rust inhibitor, such as barium sulfonate or calcium sulfonate; 1 to 2% by weight of an antioxidant, such as 2,6-di-t-butyl-p-cresol; and 2 to 7% by weight of an oiliness improver, such as oleic acid or tricresyl phosphate.

As described above, the injection molding material used in the present invention is a mixture of a synthetic resin, especially a polyolefin resin having a high oil absorption and a lubricating oil and therefore retains by itself a large quantity of a lubricating oil. On being molded and cooled, the molding material solidifies while including the lubricating oil in the synthetic resin matrix to provide a molded article maintaining the initial oil content.

Thus, the resulting molded article also retains a large quantity of the lubricating oil. Unlike the conventional cage which is obtained by immersing a molded article in a lubricating oil and therefore retains much oil only in the vicinity of its surface, oozing or release of the lubricating oil from the cage of the present invention is sustained whereby a stable lubricating action is exerted for an extended period of time.

Further, since the cage can be produced by injection molding like general synthetic resins such as polyamide resins, the bearing of the present invention is substantially as inexpensive as general ball bearings. Since no post-treatment for furnishing a cage with a lubricating oil is required, not only is reduced the time of production but product quality is uniform with no scatter of the lubricating oil content.

Furthermore, the rolling bearing using the cage of the present invention accomplishes reductions in torque required for rolling, fluctuation in torque, and noise. Additionally, oozing of the lubricating oil from the cage lasts long, achieving satisfactory lubrication for an extended period of time, and excellent durability can be attained.

The present invention will now be illustrated in greater detail with reference to Example, but it should be understood that the present invention is not construed as being limited thereto.

EXAMPLE 1

In a kneader were uniformly mixed 1.5 g of ultra-high-molecular-weight polyethylene (Mipelon XM220, produced by Mitsui Petrochemical Industries, Ltd.), 7.0 g of low-molecular weight polyethylene (PZ50U, produced by Mitsubishi Petrochemical Co., Ltd.), and 30.0 g of a paraffinic mineral oil (FBKRO100, produced by Nippon Oil Company, Ltd.) while heating at 150° C., followed by allowing to cool to solidify. The resulting solid was transferred to a grinder together with 7.5 g of the same ultra-high-molecular weight polyethylene as used above and 54.0 g of the same low-molecular weight polyethylene as used above, and the mixture was ground to obtain a uniform powdered injection molding material. The oil content of the molding material was 30% by weight.

The injection molding material was molded by means of a plunger type injection molding machine to obtain a test piece. The resulting test piece was found to have an oil content of 28.5 to 29.5% by weight, indicating substantial retention of the oil content of the injection molding material.

Figure 2:
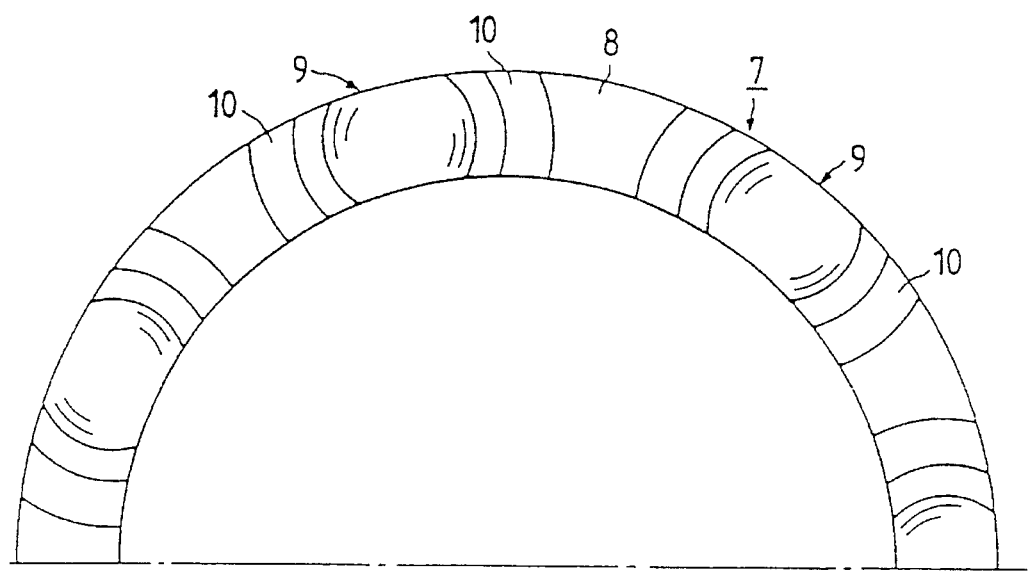
FIG. 2 is a partial enlarged plane view of an example of the cage of ball bearings.
Figure 3:
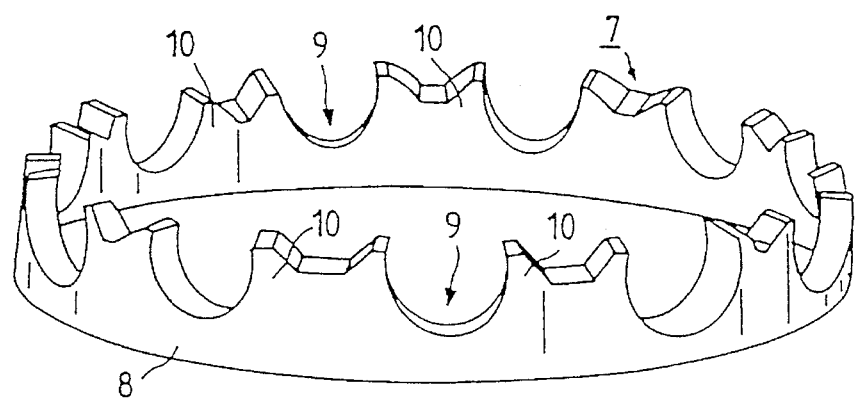
FIG. 3 is a perspective view of an example of the cage of ball bearings.

Further, the injection molding material was molded by means of a plunger type injection molding machine to obtain a crown-shaped cage as shown in FIGS. 2 and 3, and the cage was fitted into a miniature ball bearing having a inner diameter of 5 mm, an outer diameter of 13 mm, and a width of 4 mm as shown in FIG. 1.

COMPARATIVE EXAMPLE

A polyamide resin containing 10% by weight of glass fiber was injection molded to obtain a cage of the same shape as that of Example 1. The cage was fitted into the same miniature ball bearing as used in Example 1, with 15 mg of commonly employed Albania grease No. 2 (mineral oil Li soap type grease, produced by Showa Shell Sekiyu Kabushiki Kaisha) applied to the cage.

Figure 4:
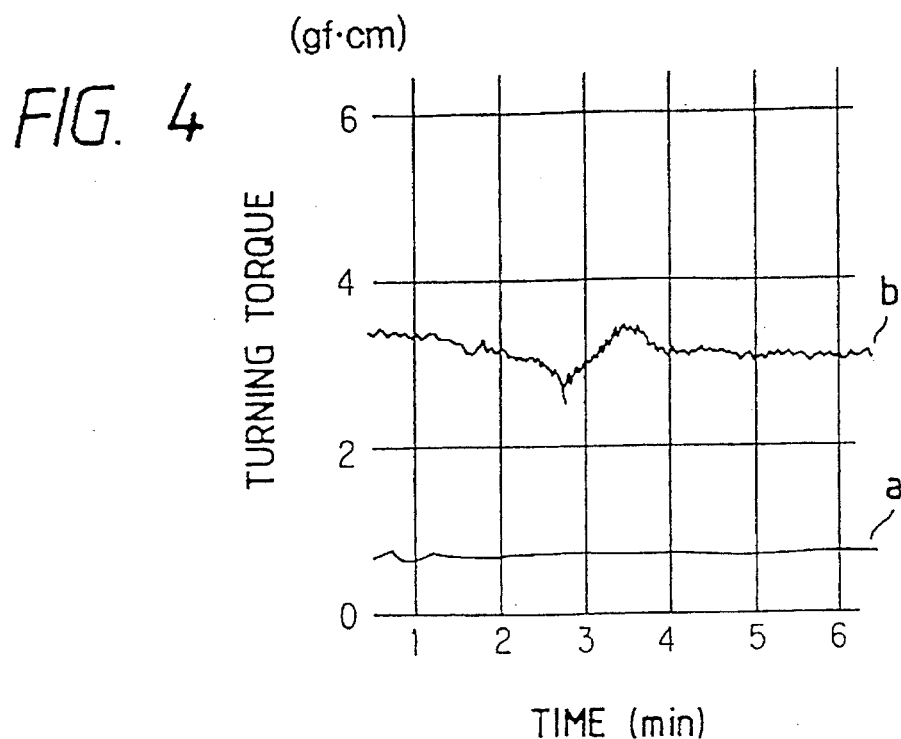
FIG. 4 is a graph of turning torque vs. time.

Measurement of Turning Torque:

The turning torque of each of the bearings of Example and Comparative Example was measured. The results obtained are shown in FIG. 4. In FIG. 4, a and b indicate the results of Example and Comparative Example, respectively.

As is apparent from FIG. 4, the ball bearing of Example according to the present invention not only has a low turning torque but shows little fluctuation as compared with the comparative bearing, proving capable of achieving stable revolution.

Figure 5:
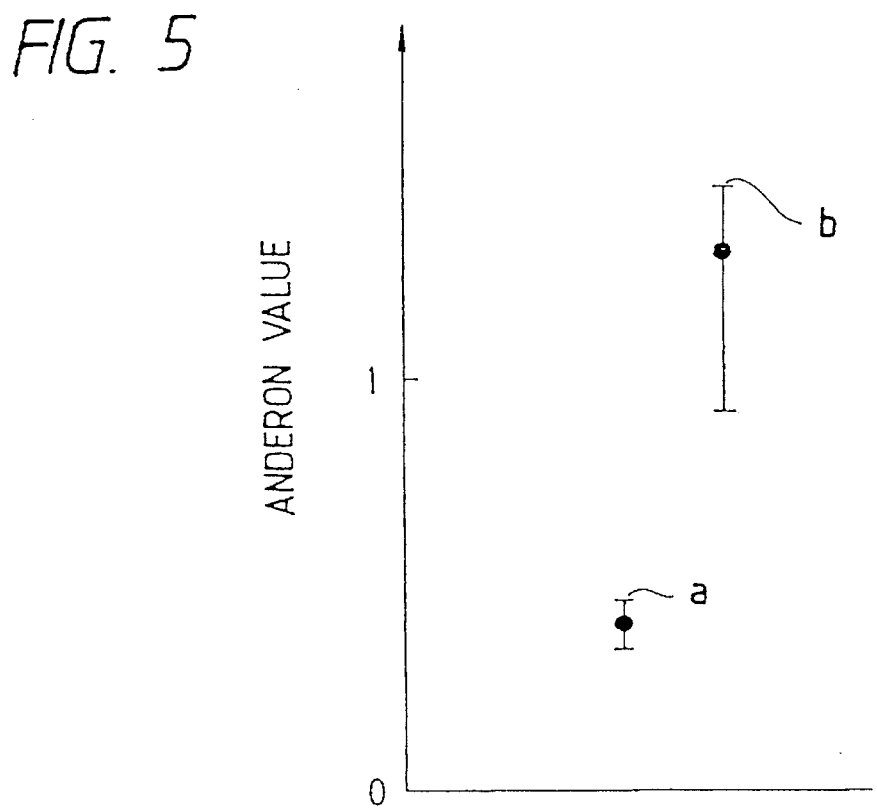
FIG. 5 is a graph showing acoustic characteristics.

Measurement of Acoustic Characteristics:

The inner race of the bearing of Example or Comparative Example was revolved at 3600 rpm with a pre-load of 2 kgf applied, and the noise generated was measured. The results obtained are shown in FIG. 5. In FIG. 5, a and b indicate the results of Example and Comparative Example, respectively, the ordinate indicates Anderon value generally used with respect to acoustic characteristics of bearings, and the upper end of each vertical line represents the maximum of the noise produced, the lower end the minimum, and the bullet in the middle an average.

As is apparent from FIG. 5, the ball bearing of Example has excellent acoustic characteristics.

The above test results lent confirmation to the fact that the ball bearing of the present invention has a small turning torque with little fluctuation and exhibits excellent acoustic characteristics.

As described above, the injection molding material used in the present invention is a mixture of a synthetic resin, especially a polyolefin resin having a high oil absorption, and a lubricating oil and therefore retains by itself a large quantity of a lubricating oil. On being molded and cooled, the molding material solidifies while including the lubricating oil in the synthetic resin matrix to provide a molded article maintaining the initial oil content.

Thus, the resulting molded article also retains a large quantity of the lubricating oil. Unlike the conventional cage which is obtained by immersing a molded article in a lubricating oil and therefore retains much oil only in the vicinity of its surface, oozing or release of the lubricating oil from the cage of the present invention is sustained whereby a stable lubricating action is exerted for an extended period of time.

Further, since the cage can be produced by injection molding like general synthetic resins such as polyamide resins, the bearing of the present invention is substantially as inexpensive as general ball bearings. Since no post-treatment for furnishing a cage with a lubricating oil is required, not only is reduced the time of production but product quality is uniform with no scatter of the lubricating oil content.

Furthermore, the rolling bearing using the cage of the present invention accomplishes reductions in torque required for turning, fluctuation in torque, and noise. Additionally, oozing of the lubricating oil from the cage lasts long, achieving satisfactory lubrication for an extended period of time, and excellent durability can be attained.

While the invention has been described in detail and with reference to specific examples thereof, it will be apparent to one skilled in the art that various changes and modifications can be made therein without departing from the spirit and scope thereof.

What is claimed is:

1. A rolling bearing comprising an outer race having one track, an inner race having another track, a plurality of rolling elements arranged between both tracks, and a cage for retaining the plurality of rolling elements in such a way that the rolling elements can roll freely, wherein the cage is a lubricating oil-containing polymer member obtained by injection molding a composition which comprises a polyolefin resin and a lubricating oil and contains the lubricating oil in an amount of 10 to 80% by weight.

2. The rolling bearing of claim 1, wherein the lubricating oil comprises at least one of a mineral oil, an alkyl polyphenyl ether oil, an alkylnaphthalene oil and a poly α-olefin oil.

3. The rolling bearing of claim 1, wherein the polyolefin resin is selected from the group consisting of polyethylene, polypropylene, and polymethylpentene.

4. A method of preparing a rolling bearing into which a cage is fitted, which comprises the steps of:

injection molding a composition to form a cage, the composition comprising a polyolefin resin and a lubricating oil, and containing the lubricating oil in an amount of 20 to 80% by weight, and fitting the cage into the rolling bearing which comprises an outer race having one track, an inner race having another track, and a plurality of rolling elements arranged between both tracks, so as to retain the plurality of rolling elements in such a way that the rolling elements can roll freely.

5. The method of claim 4, wherein the lubricating oil comprises at least one of a mineral oil, an alkyl polyphenyl ether oil, an alkylnaphthalene oil and a poly α-olefin oil.

6. The method of claim 4, wherein the polyolefin resin is selected from the group consisting of polyethylene, polypropylene, and polymethylpentene.

* * * * *